United States Patent [19]

Tsuda et al.

[11] 4,311,365
[45] Jan. 19, 1982

[54] METER FOR VEHICLES

[75] Inventors: Hiroshi Tsuda, Yokohama; Masahiro Adachi, Yokosuka, both of Japan

[73] Assignee: Nissan Motor Company, Limited, Yokohama, Japan

[21] Appl. No.: 43,701

[22] Filed: May 30, 1979

[30] Foreign Application Priority Data

Jul. 29, 1978 [JP] Japan ................................ 53-92890

[51] Int. Cl.³ ........................ G02B 27/28; G02B 27/02
[52] U.S. Cl. .................................................. 350/399
[58] Field of Search ............... 350/147, 156, 152, 111, 350/399

[56] References Cited

U.S. PATENT DOCUMENTS 2,200,300  5/1940  Roper ................................. 350/156
2,536,764  1/1951  Moulton ............................. 350/164

FOREIGN PATENT DOCUMENTS 1239080  7/1971  United Kingdom .
1407279  9/1975  United Kingdom .

Primary Examiner—William H. Punter

[57] ABSTRACT

The present invention relates to a meter suitable for use in vehicles. The meter has a polarizing window which allows light having a vertical component only to pass therethrough and is preferably oriented so that optimum angle of incidence i of the polarized light on, the windshield for example, for attenuation of the reflection thereof, occurs. The outer surface of the window is preferably provided with a non-reflecting or anti-glare finish so that light from a source external of the meter is not reflected off the window. The arrangement ensures that visibility obscuring reflections on the windshield and the like caused by the meter mounted in prominent position on the instrument panel is not caused by light sources within or external of the meter.

3 Claims, 5 Drawing Figures

METER FOR VEHICLES

FIELD OF THE INVENTION

This invention relates to a vehicle and more specifically to a meter mounted on the instrument panel of the vehicle.

BACKGROUND OF THE INVENTION

In order to display the requisite amount of information for vehicle operation and control it is necessary to provide a meter or meters on the instrument panel of the vehicle. Further in order for the driver and/or passenger or passengers of the vehicle to be able to read the meter or meters in the dark or in dimly lit areas, such as tunnels and the like, it is well known to provide illumination in the form of incandescent bulbs or the like in the meter for illuminating the display thereof in a manner that the information displayed thereon is readily visible. However this illumination has created a problem in that the light emitted from the meter into the cabin of the vehicle is apt to reflect on the windshield of the vehicle and or other surfaces in a manner that visibility and especially driver visibility is obscured. This of course is highly undesirable and reduces the drivers ability to safely control the vehicle.

PRIOR ART

One prior art arrangement currently enjoying widespread use is depicted in FIG. 1 of the drawings. As shown the meter is set into the instrument panel so as to be sequestered from the face or front surface of the instrument panel. Further the instrument panel is provided with an awning or canopy for preventing the light emitted from the meter from being reflected on the windshield or side windows.

However this arrangement has suffered from the drawbacks that positioning of the meter or meters on the instrument panel in a readily observable position while maintaining effective blocking of the light rays by the canopy is rather difficult within the limited space available and even more so in order to achieve an aesthetically pleasing instrument panel design. Hence the driver of the vehicle is, with this canopy arrangement, required to peer under said canopy in order to clearly read given portions of the display. A more detailed description of the construction of the just described prior art arrangement will be given in a later portion of this disclosure.

SUMMARY OF THE INVENTION

In order to overcome all of the above mentioned drawbacks and to provide an arrangement where placement of an un-hooded meter on a relatively high portion of the instrument panel wherein the display read and an light aesthetically pleasing arrangement is possible, the present invention provides a meter which has a window thereof formed of or with a light polarizing sheet through which all of the light entering the vehicle cabin must pass.

The meter is also oriented with respect to the windshield of the vehicle so that the angle of incidence of the polarized light on said windshield is such that the minimum amount of light is reflected back off the windshield into the cabin particularly in the direction of the drivers eyes.

It is therefore an object of the present invention to provide a meter for a vehicle in which only light having a vertical wave component is allowed to be omitted from the meter into the vehicle cabin.

It is another object of the present invention to provide a vehicle with a meter which is so oriented with respect to the windshield that the polarized light emitted therefrom and which is subject to reflection on the windshield of the vehicle impinges on the windshield to minimize the reflection back into the vehicle cabin.

It is also a feature of the present invention to provide a meter for a vehicle which permits pleasing and aesthetic designs and layouts on relatively high portions of the instrument panel and which does not produce any vision obscuring reflections on any surfaces in the vehicle cabin.

BRIEF DESCRIPTION OF THE DRAWINGS

Further objects, features and advantages of the present invention will become evident as the description of the preferred embodiment is made taken in conjunction with the accompanying drawings in which.

DETAILED DESCRIPTION OF THE PREFERRED EMBODIMENTS

Figure 1:
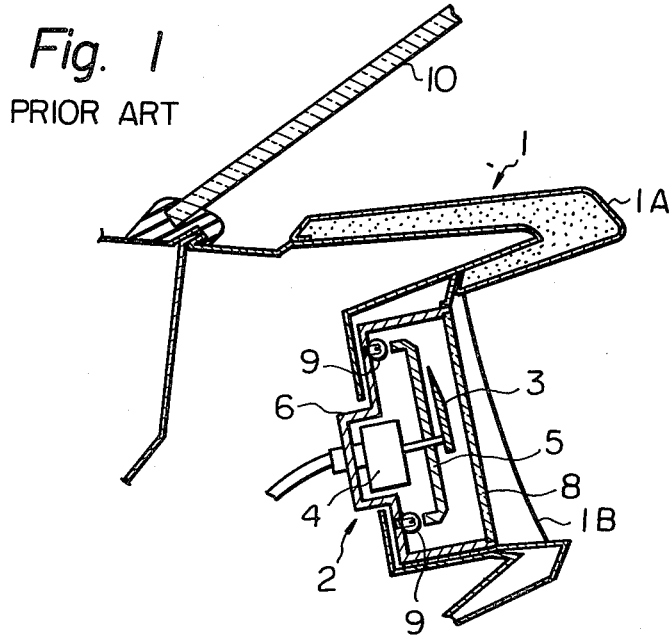
FIG. 1 is a sectional view of the prior art arrangement briefly discussed in an earlier portion of the present invention.

Before proceeding with a detailed description of the preferred embodiment it is deemed advantageous for a deep understanding of the subject matter of the present invention to once more consider the prior art arrangement depicted in FIG. 1 of the drawings.

In FIG. 1 the numeral 1 denotes an instrument panel, 2 a meter by which information is displayed for the drivers observation and comprehension, 3 a needle or indicator, 4 a motor or arrangement whereby an input signal or signals (which may be mechanical or electrical) is converted or transduced to move the needle or indicator 3 to an appropriate indicating position. The numeral 5 indicates a display panel on which calibrations or the like are provided and 6 indicates a housing which encloses the afore listed elements. Disposed within the housing 6 and located in appropriate positions rear of the display panel 5 are illuminating means such as incandescent bulbs 9. These bulbs illuminate the panel with light so that the meter is readable in poorly lit conditions. A transparent window 8 is disposed so as to close the housing 6. The transparent window 8 can be so disposed as to close the housing 6 or disposed adjacent the housing and mounted to the instrument panel as desired.

Now as briefly described in the earlier under the heading of "prior art" the meter 2 is arranged as shown recessed or sequestered from the face or front surface 1B of the instrument panel 1. At the upper edge portion of the instrument panel 1 a canopy or hood member 1A projects beyond the face 1B into the cabin of the vehicle (no numeral) so as to intercept any light rays passing from the meter 2 to the windshield 10 of the vehicle.

It will be readily understood that the hood member 1A necessitates the position of the meter being relatively low on the instrument panel and that any attempt to raise the meter will result in either the meter being partially obscured by the hood member, or the hood member being raised into a position where it directly blocks the driver and or passengers view. Furthermore in the interest of safety the hood member 1A must be padded as shown and cannot be excessively rigid and not have a sharp edge. Therefore it is extremely difficult to reduce the dimensions of said hood member 1A.

Figure 2:
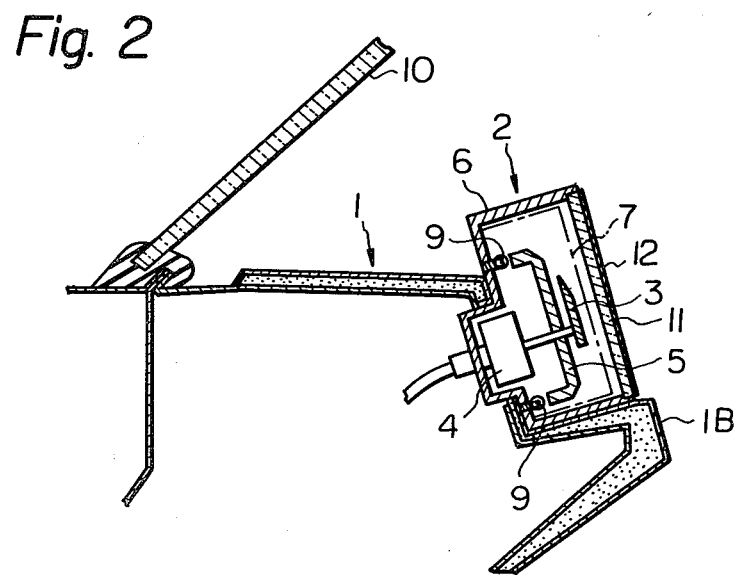
FIG. 2 is a sectional view of the preferred embodiment of the present invention.

Turning now to FIG. 2 we find a sectional view of the preferred embodiment of the present invention. Wherever possible the same numerals as used in FIG. 1 are used to denote like parts in FIG. 2 thus a detailed listing of the elements will be omitted for brevity. In this figure the numeral 7 indicates an alternative display unit which may, by way of example take the form of a liquid crystal digital display or the like.

Now looking to the present invention a transparent window of material 11 having light polarizing characteristics is disposed so as to close the front of the housing 6. This may be made of any one of a number of commercially available products having the desired mechanical properties. The polarizing window 11 is oriented so that only light having a vertical (with respect to the vehicle body) wave component or electric vector is permitted to pass through said window.

Highly advantageously an anti-glare or non-reflecting coating or sheet of material 12 having such properties is provided on the external surface of the window or polarizing sheet 11. The reason for this will be made clear later in this disclosure.

Figure 3:
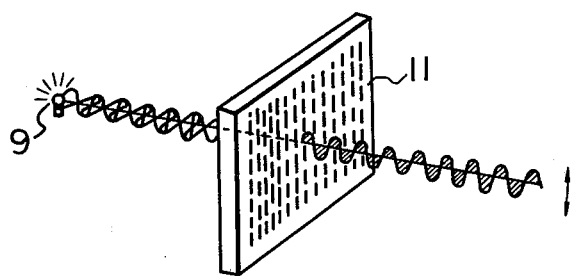
FIG. 3 is a sketch showing in diagrammatic form the polarization of light emitted from a light source as it passes through a transparent sheet of material having light polarizing properties.

FIG. 3 clearly illustrates (schematically) the polarization of the light emitted from the light source 9 as it passes through the polarization window (as it will be referred to therein after). As shown the light has only one wave component after passing through the window.

Figure 4:
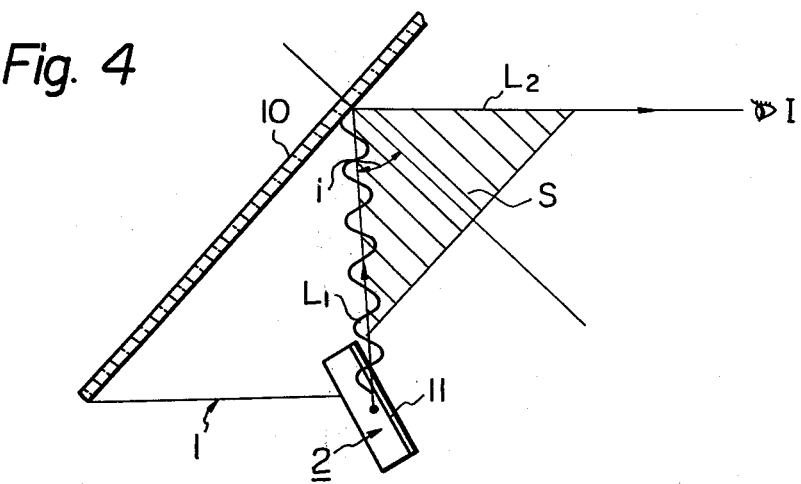
FIG. 4 is a schematic diagram showing the orientation of the meter of the present invention with respect to the windshield of the vehicle and the light from the meter which impinges thereon.

Looking now to FIG. 4 of the drawing it will be understood that in the case of non polarized light or in the case of polarized light having a wave component parallel with the surface of the windshield viz, has a wave component vertical with respect to the plane of incidence S, then the incident light ray $L_1$ will be strongly reflected in the form of reflected light ray $L_2$. However in the case that the incident light has a wave component which is parallel with the plane of incidence S the light will impinge on the surface of the windshield 10 in a manner that the reflected ray $L_2$ is greatly attenuated. Hence any light reaching the eyes of the driver or passengers will be markedly reduced.

While it has been noted that the reflection is attenuated at any given angle of incidence it has been observed that depending on the reflective index of the windshield the maximum attenuation of the reflection is achieved within the range of 54 to 56 degrees and that the reflection tends to increase outside this range.

Figure 5:
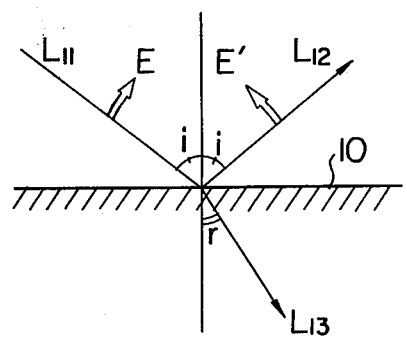
FIG. 5 is a light path diagram showing in detail the incident, refracted or transmitted and reflected light paths of the light from the meter of the present invention impinging on the windshield of FIG. 4.

In order to more fully understand the attenuation phenomenon let us look at FIG. 5 wherein the incident light ray $L_{11}$ impinges on the surface of the windshield 10 to be divided into a reflected ray $L_{12}$ and a refracted ray $L_{13}$.

In the case the incident ray has a wave component vertical with respect to the plane of incidence S the light is reflected without fail. The intensity of the reflected ray is of course dependent on the angle of incidence i.

However in the case the light ray incident on the windshield has only a wave function parallel with respect to the plane of incidence S very little light will be reflected depending on the angle of incidence as will be better understood from the following equations.

Assuming that the electric vector of the incident light is E and that of the reflected light is E' it can be shown that:

$$E'/E = \tan(i-r)/\tan(i+r) \qquad (1)$$

The condition for minimum or no reflection occurs when E=0. When (i+r)=90 degrees, the relationship $\tan(i+r) \to \infty$ holds and therefore the minimum reflection requirement is met. Hence it can be shown that:

tan i=n (where n is the refractive index)

Since the refractive index of glass is usually between 1.4 and 1.6 it can be shown that:

i=54 to 56 degrees

Accordingly when the angle of incidence of the light with the surface of the windshield is between 54 and 56 degrees maximum attenuation of the reflected beam or ray is achieved.

Consequently the meter of the present invention makes it possible to mount the meter on or in instrument panel so as to align with the face thereof without the provision of the hood or canopy 1A and without encountering the drawback of visibility impairing images appearing on the windshield directly in the drivers and or passengers view. Thus the meter can be mounted as shown in FIG. 2 in a high and readily visible position. Further the freedom with which other members other than the meter can be provided on the instrument panel is increased.

With the arrangement set forth above the reflections due to the emission of light from the meter at night is eliminated, however the meter as shown in FIG. 2 is in a very good position to reflect light from a source outside the meter 2. For example daylight is apt to enter the cabin of the vehicle and reflect off the meter window. Hence as mentioned earlier it is highly advantageous to provide an anti-glare or non-reflecting frosting or the like on the external surface of the window. This is quite important as the light which would otherwise reflect off the meter window would have a wave component normal to the plane of incidence as reflected light tends to have a highly polarized nature.

It is possible that the meter takes the form of a liquid crystal display or the like. The use of such devices lends itself to the invention nicely as the thickness of liquid crystals for example, is in the order of 0.5 cm or less. Further the problem of light reflection with such liquid crystals which has hereto been a problem is also solved, while markedly increasing the amount of space available for the placement of the meters controls etc.

Hence it will be readily appreciated that for any given windshield angle it is an easy task to arrange the meter at the optimal angle both for easy vision by the driver and for the minimum amount of reflection of light.

Of course the present invention is not limited to meters and can extend to such arrangements as spotlight type cabin lights or the like which may induce the highly undesirable visibility impairing images on the windshield or other window members of the vehicle.

What is claimed is:

1. A vehicle having a windshield, a meter, a housing containing therein said meter and a light source; and having a light polarizing window immovably fixed to the front of said housing, said housing being oriented with respect to said windshield so that maximum attenuation of the polarized light, emitted from said meter and reflected off said windshield, is achieved, said window further having an external surface which is non-reflecting.

2. A vehicle as claimed in claim 1, wherein given the refrative index of the windshield n, the optimal angle of incidence i of the polarized light on said windshield is given by: $\tan i = n$.

3. In a vehicle having a cabin, the combination of:

an instrument panel;

a windshield mounted adjacent to and at an angle with respect to said instrument panel;

a meter disposed unhooded at the top of said instrument panel and oriented so that light emitted from said meter will impinge on said windshield;

a polarizing window immovably fixed to the front of said meter to attenuate the reflection of the light impinging on said windshield; and non-reflecting surface means disposed over the surface of said polarizing window.

* * * * *